May 30, 1961 F. L. STRICKLIN, JR 2,986,694
APPARATUS FOR EXPLORING DRILL HOLES
Filed July 11, 1956 5 Sheets-Sheet 2
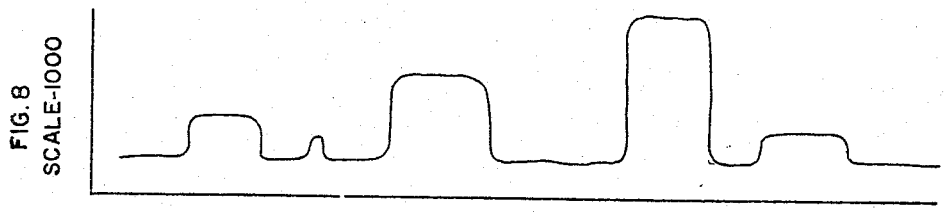
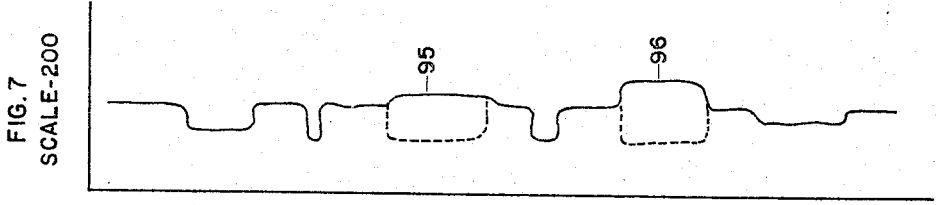
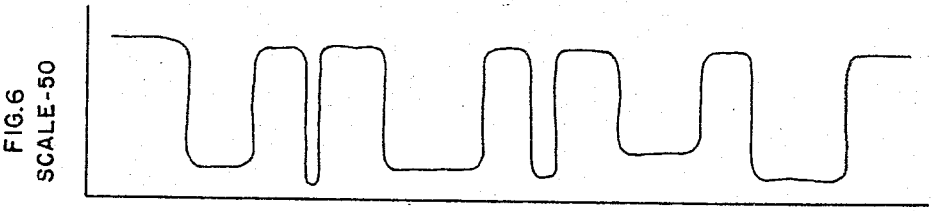
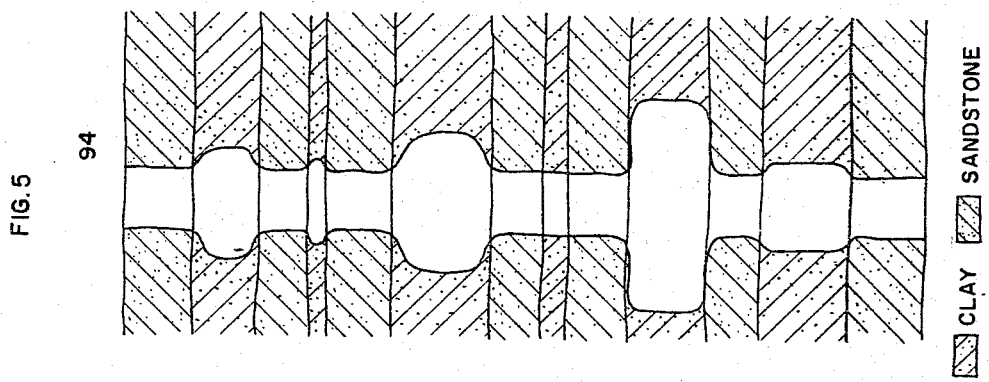
INVENTOR
F L. STRICKLIN, JR.
BY: J. H. McCarthy
HIS AGENT

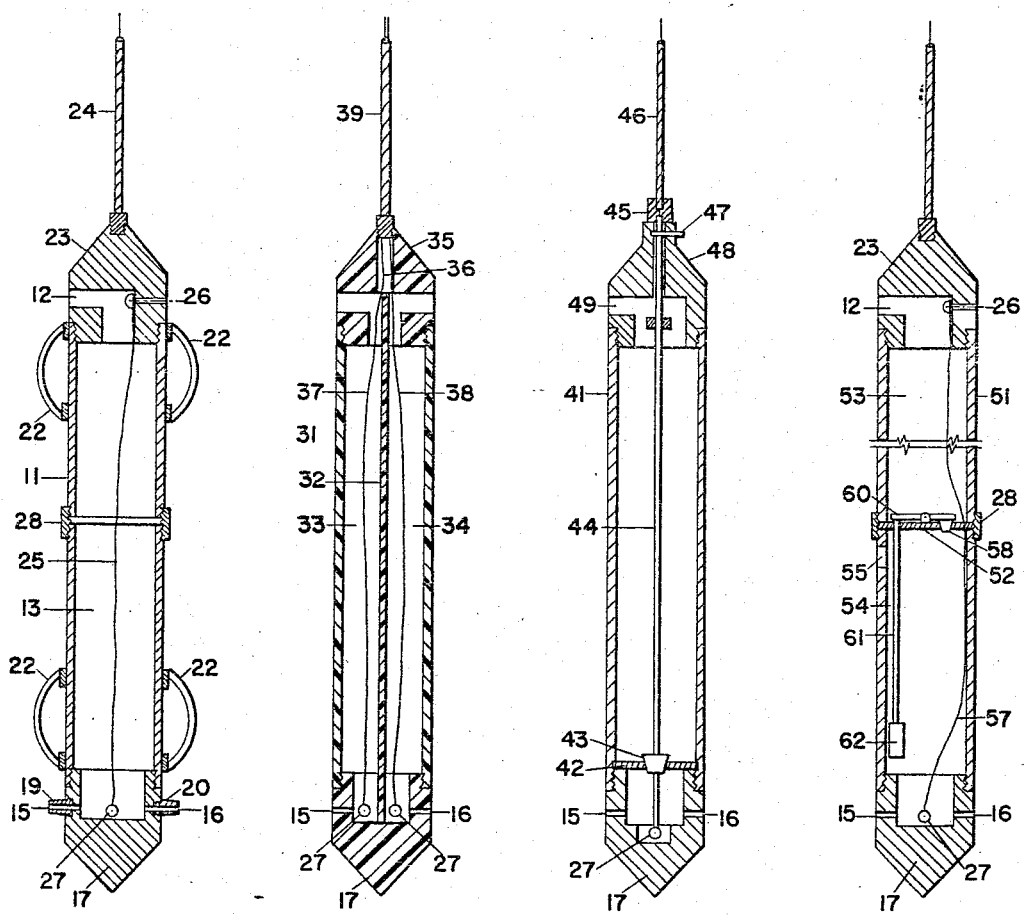

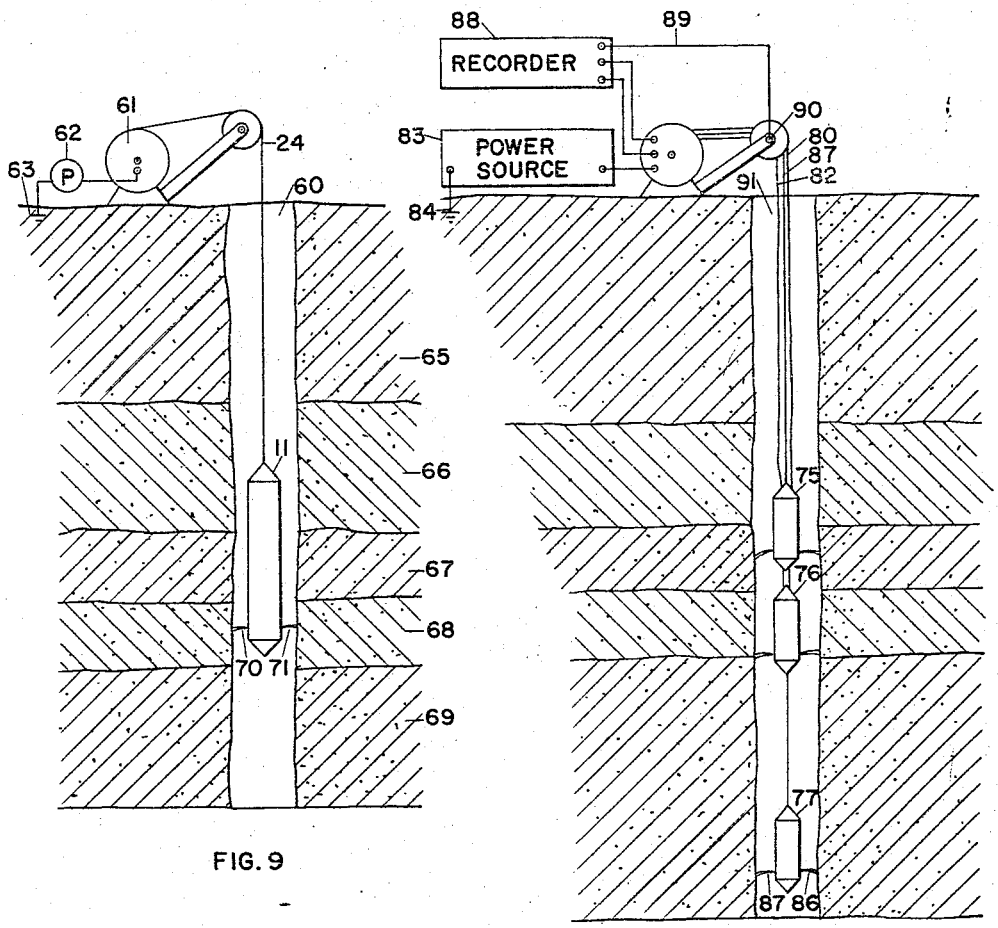

May 30, 1961 F. L. STRICKLIN, JR 2,986,694
APPARATUS FOR EXPLORING DRILL HOLES

Filed July 11, 1956 5 Sheets-Sheet 4

INVENTOR
F. L. STRICKLIN, JR.
BY: J. H. McCarthy
HIS AGENT

United States Patent Office 2,986,694
Patented May 30, 1961

2,986,694

APPARATUS FOR EXPLORING DRILL HOLES

Frederic L. Stricklin, Jr., Kerrville, Tex., assignor to Shell Oil Company, a corporation of Delaware Filed July 11, 1956, Ser. No. 597,215

16 Claims. (Cl. 324—10)

The present invention relates to the exploration or logging of drill holes in the earth, and pertains more particularly to the logging of drill holes that do not contain a column of electrically conductive liquid.

It is well known that the lithologic character of the formations exposed in the wall of a drill hole and their fluid content may be determined by methods which involve measurement of electrical properties of the rock masses as they exist in place. These methods of exploring a drill hole, known as electrical logging methods, are capable of measuring or detecting a characteristic property or properties of the various formations traversed by a drill hole due to the fact that sedimentary formations usually contain water in their pore spaces, frequently salt water, which renders them conductive to electric currents in varying degrees. Thus, by lowering one or more electrodes of a logging apparatus down through a drill hole, it is possible to record, at the surface, the measurements obtained as the electrodes pass the different strata traversed by the drill hole.

Since most oil and gas wells are drilled by the rotary method, wherein a drilling mud is circulated in the drill hole throughout the drilling operations, the column of mud or water in a drill hole acts as a conductive liquid permitting the passage of electric currents between an electrode suspended in the well and the formations traversed by the well. However, during the past few years there has been a substantial increase in the number of wells, particularly exploratory wells, that have been drilled, at least partially, without a conductive drilling fluid, for example, using air, gas or an oil-base mud as a drilling fluid.

In order to log wells which do not contain a conductive liquid, it is necessary to use a logging apparatus employing electrodes which contact the walls of the borehole when a log is being run. The contacting elements of these electrodes, known as scratcher-type electrodes, are usually metal probes or fingers, which may, for example, take the form of a circular brush. Alternatively, various types of brine-saturated porous materials have been tried as electrodes connected to the cable terminals which are lowered or withdrawn from the well.

When the contacting elements of the conventional electrodes are pressed firmly against the wall of a drill hole, they tend to catch or hang up on any obstructions encountered. On the other hand, if they are only lightly pressed against the formation, they tend to bounce over obstructions and produce spurious signals as their contact resistance is varied. At other times, they fail to make contact with the formation in cavernous sections of the well bore.

It is therefore a primary object of the present invention to provide a well logging apparatus with an electrode adapted to maintain contact with the walls of a well bore at all times as the electrode is moved through a well which does not contain a conductive liquid.

A further object of the present invention is to provide a logging apparatus employing an electrode of simple and rugged construction which is adapted to pass readily through a drill hole and establish electrical contact therein.

It is another object of the present invention to provide a well-logging apparatus with an electrode of such design that it does not hang up on obstructions or formation irregularities encountered when being lowered through a drill hole.

A further object of the present invention is to provide a logging apparatus employing one or more electrodes, which is capable of being run through the well to obtain, either alternately or simultaneously, a measurement of the electrical properties of the drill hole and diametric measurements of the drill hole in the form of a caliper log.

These and other objects of this invention will be understood from the following description taken with reference to the drawing, wherein:

Figures 1, 2, 3, 4, 11, 12 and 14 are diagrammatic views taken in longitudinal cross section of various forms of the electrode of the present logging apparatus.

Figure 5 is a schematic diagram illustrating a vertical cross section of a drill hole showing various layers of clay and sandstone traversed by the drill hole.

Figures 6, 7 and 8 are electric log diagrams showing typical restivity curves obtained when the electrode of the present logging apparatus is run through the borehole of Figure 5.

Figures 9 and 10 are schematic views showing the logging electrode of the present invention positioned in a drill hole in operating position.

Figure 11:
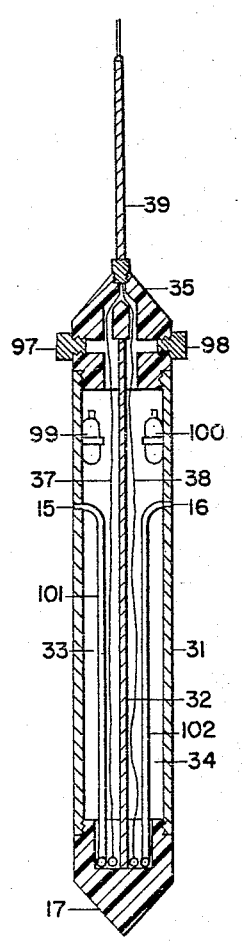

Referring to Figure 1 of the drawing, the electrode of the present logging apparatus comprises an elongated, hollow housing 11 which is preferably tubular in shape and is adapted to contain a liquid therein. The housing 11 is provided with an opening 12 near the upper end thereof whereby the central chamber 13 of the housing 11 may be filled with a liquid. The opening 12 into the housing 11 is preferably normal to the main axis of the housing so that pieces of formation or debris cannot fall into the housing 11 as it is lowered through a drill hole. If desired, the opening 12 may be substantially closed by any suitable closure means well known to the art. It is essential that the closure means used should permit the entrance of air into the housing so that a vacuum is not formed therein as fluid is being drained therefrom.

Near the lower end of the housing 11 there is provided one or more discharge ports 15 and 16 which are drilled or formed in the bottom plug which forms the closure means at the lower end of the housing 11. The fluid discharge ports 15 and 16 are formed in a direction normal to the axis of the housing 11 so that when the electrode is lowered through a drill hole fluid being discharged from the housing 11 is directed substantially horizontally against the walls of the drill hole. If desired, nozzles 19 and 20 may be secured to the bottom plug 17 over the discharge ports 15 and 16 so that jet efficiency is improved and the fluid being discharged therefrom has a shorter travel distance to the walls of the drill hole.

The elongated tubular housing 11 is preferably provided with suitable centralizing devices 22, which may be of the spring-type, to position the electrode centrally in the drill hole as it is run therethrough. The top opening 12 into the housing 11 may either be formed in the wall of the housing 11 or through the head plug 23 which closes the top of the housing 11. The head plug 23 and the bottom plug 17 are preferably made of brass so as to form an electrical connection with an insulated conductor cable 24 through which electrical potentials may be applied to the electrode and by which the electrode is lowered or raised through the drill hole. A lead 25 is electrically connected to the plug 23 by any suitable means, as by a bolt 26, and depends therefrom down to the bottom of the housing 11, the lower end of the insulated lead 25 being secured to a lead ball 27 which serves as a contact. Thus, an electrical contact can be maintained at all times down through the cable 24, plug 23, lead 25, with the water contained in the housing 11 and being jetted out through the nozzles 15 and 16.

The tubular housing 11 may be of any desired length and diameter, say ten feet and three inches, respectively, depending upon the amount of liquid to be contained therein. The diameter of the housing 11 should be small enough so that it could be readily run through a drill hole. If desired, the housing 11 may be made in two sections fastened together by a collar 28, so that additional lengths of tubular housing may be added to make the housing longer. A flexible insulated lead 25 is preferably used whose length can be readily changed with that of the housing 11. Instead of a flexible insulated lead 25, a rigid lead, such as a rod, may be run between head plug 23 and bottom plug 17 and electrically connected thereto. The insulated lead 25 connecting the liquid in the housing 11 to the cable conductor may be eliminated if the housing 11 and heads 17 and 23 are made of a conductive material which is suitably insulated so that streams of fluid flowing from the housing form the only electrical connection between the conductor and the formation. In the event that the tubular housing 11 and heads 17 and 23 are made of metal, they are preferably coated with an insulating paint on the outside thereof so that any accidental contact of the housing 11 or heads with the wall of the drill hole does not interfere with the signals normally being recorded at the surface. Preferably, the housing 11 is made of any suitable insulating plastic material. If desired, the plugs 17 and 23 may be made of the same plastic material.

Basically, the electrode of Figure 1 provides means for establishing an electrical contact between the terminal or lower end of the well logging cable 24 and the surrounding formation, by causing a stream of conductive liquid to flow along a path extending between the formation and the housing electrically connected to the cable terminal 24.

In the event that it is desired to jet two different types of conductive fluids from a common electrode, an electrode similar to that illustrated in Figure 2 may be employed. In this form of the electrode an elongated tubular housing 31 is provided with a separating partition 32 which forms independent chambers 33 and 34 therein for containing two different conductive fluids. The top of the housing 31 is closed by an insulating plug 35 having a passage 36 formed therein through which insulated conductor leads 37 and 38 are electrically connected to corresponding conductors in cable 39. With this form of electrode, one chamber 33 can contain saturated brine and the other chamber 34 can contain fresh water to permit two independent signals to be obtained simultaneously as the electrode is run through the drill hole.

Since the jet discharge ports 15 and 16 of the electrodes shown in Figures 1 and 2 are both open at all times, it is evident that the fluid starts jetting therefrom as soon as any cap or other temporary closure means (not shown) has been removed from the outside of the bottom plug 17 just before lowering the electrode into a drill hole. At times it is desirable to lower the electrode several hundred feet into a drill hole before establishing electrical contact between the electrode and the formation wall by jetting fluid from the electrode. In this case an electrode similar to that illustrated in Figure 3 may be employed. In this form the tubular, elongated housing 41 is closed at the bottom by a plug 17 provided with jet discharge ports 15 and 16, similar to Figures 1 and 2.

In addition a plate closure means 42 is positioned just above the plug 17 and is provided with a central opening which is normally closed by a valve 43. The valve 43 is fixedly secured to a rigid rod 44 which extends through the length of the housing 41 and up through the top plug 48 where it is connected, by means of a coupling 45, to the cable 46 which runs to the surface. A shear pin 47 is provided which extends through the neck of the plug 48 and into the rod 44 whereby the valve 43 is maintained in a closed position. Since the rod 44 also acts as a conductor between the water in the lower end of the housing and the cable 46, a stop member 49 is provided, preferably secured to the rod 44, which limits the upward movement of the rod after valve 43 is opened. It is to be understood that the electrodes shown in Figures 2, 3 and 4 of the drawing may also be provided with centralizer means 22 as shown in Figure 1. In using the electrode of Figure 3, it is filled at the surface with a fluid with valve 43 closed, and then lowered to the desired position in a drill hole at which time a sharp upward jerk is applied to the hoisting cable 46, shearing the pin 47. When pin 47 shears, the valve stem 44 moves upwardly until stop 49 contacts plug 48. With valve 43 open, the fluid inside housing 41 jets down through the opening in the plate 42 and out the jets 15 and 16, while the lead ball 27 at the bottom of the valve stem 44 maintains contact at all times with the liquid in said housing as it is drained therefrom.

If an exceedingly deep drill hole is to be logged throughout its entire length, an extremely long housing would have to be employed for the electrode in order to have sufficient fluid to provide a jet of fluid against the formation wall throughout the time interval necessary to make the run. Due to the increased head of fluid in an electrode twice as long as one previously used, relatively little increase in the time necessary to jet all the fluid from the electrode is realized. To increase the time interval over which a jet of fluid may be maintained, an electrode similar to that shown in Figure 4 is employed wherein the housing 51 is divided by suitable plate means 52 into two chambers 53 and 54 positioned coaxial of each other. The upper chamber 53 may be filled through opening 12 in the side of the head plug 23 while the lower chamber 54 may be filled through opening 55 in the wall of the housing 51 below the plate 52. An insulated flexible conductor 57 is electrically connected by a bolt 26 to head plug 23 and extends down through plate 52 to the bottom of the housing adjacent the jet discharge openings 15 and 16.

The plate 52 is provided with an opening therein which is closed normally by a valve 58. The valve 58 is connected by linkage members 60 and 61 to a float 62 positioned in the lower portion of the lower chamber 54. Thus, with the lower chamber 54 filled with liquid, the float 62 maintains a buoyant action which, through linkage members 61 and 60 maintains a valve 58 in a closed position. During operation, when the electrode has been lowered for a time sufficient for the fluid in the lower chamber 54 to be discharged therefrom so that the liquid level falls below float 62, valve 58 opens and allows fluid in the upper chamber 53 to drop into the lower chamber 54 and be discharged out the ports 15 and 16. Thus, the additional fluid in the upper chamber 53 does not increase the head on the fluid being discharged from chamber 54, whereby the time interval over which fluid jets from the electrode is prolonged. A simpler arrangement is to remove the valve 58 and linkage members 60, 61 and float 62 from the housing shown in Figure 4, and to adjust the opening in the plate 52 normally closed by valve 58 to a size such that it allows fluid to run from the upper chamber 53 into the lower chamber 54 at a rate substantially equal to that at which fluid is being discharged from a lower chamber 54 to ports 15 and 16.

Due to filling port 55, there would be a small air space below plate 52 at all times.

The electrode of Figure 11 is similar to that shown in Figure 2 except that plugs 97 and 98 are provided to close the openings at the top of chambers 33 and 34. Liquefied gas containers 99 and 100, for example, carbon dioxide capsules, are mounted in the independent chambers 33 and 34 to serve as gas pumps to drive the conductive liquids through the discharge ports 15 and 16. These ports can be located anywhere along the housing 31 when connected to the lower portion thereof by conduits 101 and 102. Expanding gas from the capsules 99 and 100 pressurizes the chambers 33 and 34 to force the liquid in the housing 31 through conduits 101 and 102 to the discharge ports 15 and 16 under a gas drive which renders insignificant any hydrostatic head due to the length of the column of liquid in the housing 31.

Figure 12:
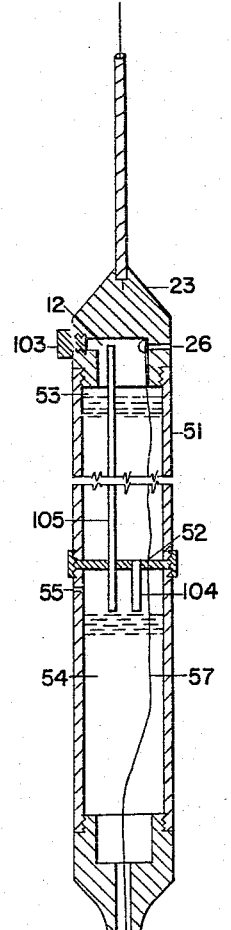

In Figure 12, an electrode is illustrated that is somewhat similar to the electrode of Figure 4 in that means are provided for maintaining a constant head of liquid. The opening at the top of the housing 51 is closed by a plug 103. Two conduits 104 and 105 extend through transverse plate 52 establishing open communication between chambers 51 and 53. Conduit 105 extends from the upper part of chamber 53 to a point below opening 55 in the lower chamber 51 while conduit 104 extends from plate 52 into chamber 51 the same distance. With chamber 53 closed by plug 103, the flow of liquid from chamber 53 through conduit 104 causes a vacuum which stops the flow. When the liquid level in chamber 51 drops below the end of conduit 105, air is drawn through port 55 into chamber 51, and thence through conduit 105 into chamber 53. This relieves the vacuum in chamber 53 thus allowing more liquid to flow through conduit 104 into chamber 51. This arrangement confines the liquid level in chamber 51 within a narrow range.

Figure 13:
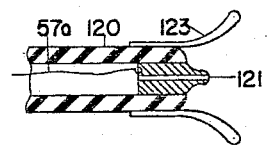
Figure 13 is a detail view of a portion of the electrode of Figure 12.

The electrode of Figure 12 is also provided with means for shortening the length of the liquid streams discharged therefrom. These means may comprise lengths of flexible hose 120 of rubber or plastic which extend the body of conductive liquid to points close to the formation in a well. Nozzles 121 may be provided at the end of the hoses 120 which are electrically connected to the logging cable by extensions 57a of the wire lead 57, as shown in enlarged detail in Figure 13. Guide prongs 123 are attached to the ends of the hoses so that the nozzles 121 are held at substantially the same angle with respect to the formation, slanting upward as the electrode moves down the hole, and slanting downward as the electrode moves up the hole.

Figure 14:
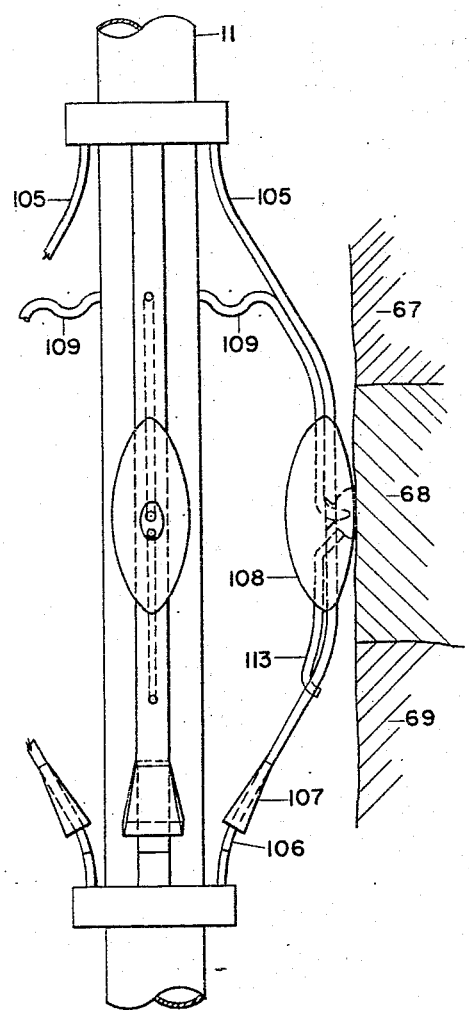
Figure 15:
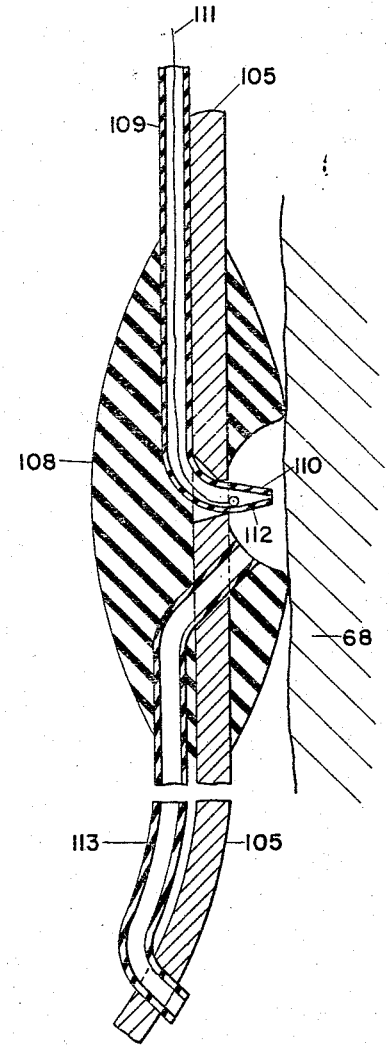
Figure 15 is a detail view of a portion of the electrode of Figure 14.

Figures 14 and 15 show another form of the electrode for reducing the effects of varying borehole diameters by holding the fluid discharge nozzles close to the borehole wall. The electrode housing 11 is provided with bowed-spring centralizers 105, which are preferably insulated by coating them with a nonconductive material and/or providing them with a section of insulating structural material 106, partially surrounding the nonconductive shield 107 to prevent it from acquiring a coating of sprayed conductive materials. The central portion of the centralizers is provided with pads of nonconductive material 108. The conductive liquid is fed from discharge ports within housing 11, through flexible nonconductive hoses 109, to discharge nozzles 110 mounted within pads 108 and insulated from centralizer 105.

To insure the shortest possible liquid path between the cable conductor and the formation, the lead connecting the cable conductor with the conductive liquid can be extended by threading wires 111 through hoses 109 to the discharge nozzle 110. The fluid accumulating in the cavity 112 in the outer side of the pads can be conducted away via hoses 113. In a well filled with a nonconductive liquid, such as an oil-base mud, the pad cavities 112 cooperating with hoses 113 to screen the jet electrode from the influence of the borehole fluid are especially beneficial.

Referring to Figure 9 of the drawing, the electrode 11 of the present logging device is shown as being electrically connected to an insulated conductor cable 24 and lowered into a drill hole 60 by means of a winch 61. The cable 24 is electrically connected through any suitable potential-measuring apparatus 62 which is grounded at 63. The drill hole 60 is shown as traversing a plurality of formations 65 to 69 which may or may not contain an electrolyte or electrolytes. The drill hole 60 is further shown as being empty due to the fact that the hole was either drilled with air or gas or, if drilled with a liquid drilling fluid, that the liquid had escaped into porous strata of the well. In the event that spontaneous potential differences exist along the drill hole, they may be detected in accordance with the present invention by running the electrode 11 through the drill hole so that the jetting streams of fluid 70 and 71 discharged from the lower end of the electrode 11 impinge on the walls of the drill hole. Since porous formations normally contain a fluid, which is an electrolyte, the potential-measuring device 62 at the surface indicates and records potential differences which vary in accordance with whether the jetting fluid streams 70 and 71 from the electrode impinge upon porous or impervious beds. By plotting or recording potential differences measured by the instrument 62 as a function of the depth of the electrode 11 as well, the position of the various beds therein may be readily determined.

A series of the present electrodes may be used in a system illustrated in Figure 10 wherein three spaced electrodes 75, 76 and 77 are simultaneously lowered on insulated cables 80, 81 and 82, or on a single cable adapted to transmit three signals. The lowermost electrode 77 and its cable are electrically connected to a power source 83 which is grounded at 84 thus forming means for passing an electric current through the well and, by means of jetting streams 85 and 86, into the surrounding formation. An electric field is thus set up around the electrode 77. The other two electrodes 75 and 76 are connected by means of their conductor cables to a recorder or other potential-measuring device which in turn is connected through lead 89 to a suitable device carried on the sheave 90, such for example as a selsyn generator, which indicates the travel of the sheave and hence the depth of the electrodes in the well 91. The recording mechanism 88 at the surface indicates the differences in potential between the upper electrodes 75 and 76 which is a measure of the average resistivity of the earth formation surrounding these electrodes. As the electrodes are slowly lowered through the drill hole, a curve may be plotted on the recorder 88 of changes in potential depth.

As shown in Figure 5, a drill hole may traverse numerous strata of varying materials such as clay, sandstone, and other materials. At the same time, the drill hole 94 may vary in diameter throughout its length due, in the example shown, to the falling off or the erosion of the clay strata during drilling operations.

The resistivity curves obtained by the present logging apparatus may vary considerably, as shown in Figures 6, 7 and 8. Assuming that the electrode of the present logging device is centered in the drill hole at all times, substantial variations in the resistance values measured is due to the type of liquid contained in the electrode and being jetted therefrom. The resistance measured is the sum of two terms: one is the resistance of the jetting liquid streams and the other is the formation resistivity or a value proportional thereto. For an electrode which is filled with a saturated salt brine, centered in a drill hole and provided with two discharge jets of a diameter 0.116 inch, this resistance is approximately given by the expression $$R = 70L + 200R$$

where L is the distance in inches between the nozzles and the formation, and R is the formation resistivity (ohm-meters).

Basically, the present electrode comprises a body of conductive liquid. A portion of the liquid is contained within a housing and is electrically connected to a conductor of a well-logging cable. A stream of the liquid flows out of the housing and extends into a physical and electrical contact with the formations surrounding the well. As long as the body of liquid between the cable conductor and the formation is maintained in the form of a continuous body having substantially the same conductivity as a quiescent body of liquid of the same composition, the electrode is adapted for a wide variety of logging operations carried out in a wide variety of conditions. The continuity, or lack of continuity, of the body of liquid depends primarily upon the continuity of the stream flowing between the housing and the formation. The stream is the variable portion that may be lengthened or shortened due to changes in the diameter of the borehole. The stream is effected by the fluid properties of the liquid composing the stream, the shape of the nozzle from which the stream is discharged, the velocity of the stream, and the distance between the nozzle and the formation. The length of the body of liquid depends primarily upon the distance between the nozzle and the formation and the path followed by the stream between the nozzle and the formation. In every case, the composition of the conductive liquid, the shape of the nozzles from which it is discharged, the velocity at which it is discharged through the nozzles, and the distance maintained between the nozzles and the formation should be selected to maintain a continuous body of liquid extending between the cable conductor and the formation.

In resistivity logging, it is desirable that the connection between the cable conductor and the formation be as independent as possible from variations in either the diameter of the borehole or the fluid content of the borehole. To aid in the attainment of this, the conductive liquid used should be one having a high conductivity, such as a saturated brine, an acid, or other liquid of a high conductivity. When the conductive liquid has a very high conductivity, the resistivity of the conductive liquid remains small in comparison to that of the formation in spite of changes in the overall length of the body of conductive liquid. In addition, the stream may be arranged to provide a large cross-sectional area. This may be obtained by using a single stream of large diameter, or a plurality of streams, or any combination thereof.

In caliper logging it is desirable that the connection between the cable conductor and the formation be as independent as possible from variations in the conductivity of the formation. To aid in attaining this condition, the conductive liquid may have a very low conductivity, such as a fresh water or any liquid having a low, but appreciable conductivity, so that changes in the overall length of the body of conductive liquid between the cable conductor and the formation materially change the resistance of the connection. The cross-sectional area of the stream may be made small by using a plurality of streams having small diameters, or using a single stream, or any combination thereof.

In general, the composition of the conductive liquid, the total cross-sectional area of conductive liquid flowing between the connection with the cable conductor and the contact with the surrounding formation, the number of streams in which the liquid flows, and the velocity, pressure length, and nozzle design associated with each such streams should be selected in accordance with the type of logging operation and the conditions in which the logging operation is being conducted.

The fluid discharge ports 15 and 16 (Figure 1) which jet the liquid against the formation wall may be of any suitable size but are preferably of about 0.1 inch in diameter. An electrode with 0.116 inch nozzles has been tested under field conditions and has been found to be very good. If the nozzle diameter differs from the 0.116 inch, both terms of the expression $70L+200R$ are increased or decreased by the same factor, and the resolving power of the logging system is not changed. Experiments have shown that an electrode 13 feet long with an inner diameter of 3 inches, having two 0.116 inch jets contains sufficient liquid to provide 5 minutes of jetting time from the electrode. The time can be increased substantially by using smaller nozzles, by using a single nozzle instead of a pair, by increasing the length of the electrode housing, or by using an electrode similar to that described with regard to Figure 4 of the drawing. In an electrode actually tested in the field, the trajectory of the jetting liquid streams was found to remain substantially horizontal for a distance of at least seven inches as long as the head of liquid in the electrode is one foot or more. If trouble is encountered with salts or brine-saturated materials depositing on the outside of the electrode housing 11 or centralizer 22, they may be painted or coated with suitable materials to prevent this action, such for example as silicone or fluorinated compounds.

The expression $70L+200R$ applies to the electrode tested when it contains a saturated salt brine. If the solution is not saturated, the first term of the expression is increased and the resolving power of the logging system with respect to formation resistivities is decreased. For example, if the brine has about the salinity of sea water, the first term of the expression is increased tenfold, while the second term remains the same.

If fresh water is used in the electrode, the first term of the expression will be greater than $10,000L$ and the log obtained reflects changes in hole diameter and thus the present logging system may be employed as a caliper log.

Figures 6, 7 and 8 illustrate schematically the types of resistance curves obtained with the present logging system when different types of fluid were used in the electrode. The electrode of the present logging apparatus contained a saturated brine solution when the resistivity log of Figure 6 was obtained. This log shows accurate correlation with the different strata traversed by the borehole illustrated in Figure 5. The formation is assumed to consist of clay having a resistivity of a few ohm-meters, and of sandstone of much higher resistivity. When sea water was contained in the electrode, the resistivity curve of Figure 7 resulted. The curve is similar to that of Figure 6 but is much less definite and in two places, at 95 and 96, the curve actually becomes reversed due to abnormal changes in the diameter of the borehole at these points. If the borehole 94 of Figure 5 had been of constant diameter, the portions of the curve at 95 and 96 (Figure 7) would actually have been shown by the dotted lines.

In Figure 8 an accurate caliper log of the borehole 94 of Figure 5 was obtained when fresh water was jetted from the electrode. The fresh water used should not be distilled water or no log will be obtained. If the water proves to be too fresh so that a satisfactory log cannot be obtained, about 3 parts of sodium chloride by weight may be added to each thousand parts of water to obtain a fluid having a resistivity of the order of 2 ohm-meters. In addition to obtaining resistivity curves with the present logging apparatus, spontaneous potential curves may also be obtained.

I claim as my invention:

1. Apparatus for exploring earth formations traversed by a drill hole not containing a column of conductive liquid, said apparatus comprising an electrode having a chamber formed therein for containing a conductive liquid, and means for moving the electrode through the drill hole, the electrode having at least one substantially horizontally-directed fluid discharge port through the wall thereof whereby a stream of the conductive liquid is jetted from the electrode and against the wall of the drill hole.

2. Apparatus for exploring earth formations traversed by a drill hole not containing a column of conductive liquid, said apparatus comprising an electrode having a chamber formed therein for containing a conductive liquid, means for moving the electrode through the drill hole, and substantially horizontally-directed fluid discharge port means through the wall of said electrode near the lower end thereof whereby a stream of the conductive liquid is jetted from the electrode and against the wall of the drill hole.

3. Apparatus for exploring earth formations traversed by a drill hole not containing a column of conductive liquid, said apparatus comprising an electrode having a chamber formed therein for containing a conductive liquid, means for moving the electrode through the drill hole, the electrode having at least one substantially horizontally-directed fluid discharge port through the wall near the lower end thereof whereby a stream of the conductive liquid is jetted from the electrode and against the wall of the drill hole, and means carried on the outside of said electrode for centering it in the drill hole.

4. Apparatus for exploring earth formations traversed by a drill hole not containing a column of conductive liquid, said apparatus comprising an electrode having a chamber formed therein for containing a conductive liquid, the electrode having at least one substantially horizontally-directed fluid discharge port through the wall near the lower end thereof whereby a stream of the conductive liquid is jetted from the electrode and against the wall of the drill hole, port means through the wall of said electrode for filling said electrode with said conductive fluid, and means for moving the electrode through the drill hole.

5. Apparatus for exploring earth formations traversed by a drill hole not containing a column of conductive liquid, said apparatus comprising an electrode containing a conductive liquid, means for moving the electrode through the drill hole, wall means positioned within said electrode for dividing the interior of said electrode into two independent chambers, substantially horizontally-directed fluid discharge port means through the wall of said electrode near the lower end of each of said chambers whereby a stream of the conductive liquid is jetted from each of said chambers against the wall of the drill hole.

6. Apparatus for exploring earth formations traversed by a drill hole not containing a column of conductive liquid, said apparatus comprising an electrode containing a conductive liquid, conductor cable means for moving the electrode through the drill hole, vertical wall means positioned within said electrode for dividing the interior of said electrode into two independent chambers, substantially horizontally-directed fluid discharge port means through the wall of said electrode near the lower end of each of said chambers whereby a stream of the conductive liquid is jetted from each of said chambers against the wall of the drill hole.

7. Apparatus for exploring earth formations traversed by a drill hole not containing a column of conductive liquid, said apparatus comprising an electrode containing a conductive liquid, means for moving the electrode through the drill hole, wall means positioned within said electrode intermediate the ends thereof for dividing the interior of said electrode into two independent chambers, port means in said transverse wall means in communication between said two chambers, substantially horizontally-directed fluid discharge port means through the wall of said electrode near the lower end of said lower chamber whereby a stream of the conductive liquid is jetted from said chamber against the wall of the drill hole.

8. Apparatus for exploring earth formations traversed by a drill hole not containing a column of conductive liquid, said apparatus comprising an electrode containing a conductive liquid, means for moving the electrode through the drill hole, transverse wall means positioned within said electrode intermediate the ends thereof for dividing the interior of said electrode into two independent chambers, port means in said transverse wall means in communication between said two chambers, valve means for selectively opening and closing said port means, substantially horizontally-directed fluid discharge port means through the wall of said electrode near the lower end of said lower chamber whereby a stream of the conductive liquid is jetted from said chamber against the wall of the drill hole.

9. Apparatus for exploring porous beds traversed by a drill hole not containing a column of conductive liquid, said apparatus comprising an electrode containing a conductive liquid, means for moving the electrode through the drill hole, at least one fluid discharge port through the wall of said electrode near the lower end thereof whereby a stream of the conductive liquid is jetted from the electrode and against the wall of the drill hole, and grounded means electrically connected to said electrode for measuring the spontaneous potential differences between the electrode and ground.

10. Apparatus for locating electrolyte-containing porous beds traversed by a drill hole not containing a column of conductive liquid, said apparatus comprising a conducting electrode containing a conductive liquid, means for moving the electrode through the drill hole, at least one liquid discharge port formed horizontally through the wall of said electrode near the lower end thereof whereby a stream of conductive liquid may be jetted against the wall of the borehole, and grounded means electrically connected to said electrode for measuring the electromotive forces produced between the contacting conductive fluid and ground.

11. Apparatus for measuring the resistivity of earth formations traversed by a drill hole not containing a column of conductive liquid, said apparatus comprising an electrode containing a volume of conductive fluid, fluid discharge means near the lower end of said electrode for discharging a stream of said conductive fluids substantially horizontally against the walls of the drill hole, means for moving the electrode through the drill hole, means for connecting the electrode to a ground, means for sending an electric current through the earth between the electrode and said ground, and means for measuring the effects of the passage of this electric current through the walls of the drill hole.

12. A method of measuring variations in the physical properties of a drill hole not containing a column of conductive fluid, said method comprising conducting a volume of a conductive liquid into a drill hole, discharging at least a portion of said volume of liquid in at least one small-diameter jet stream directed substantially horizontally against the wall of said drill hole, conducting a current across the jet stream, and measuring the voltage required to conduct said current across said jet stream.

13. A method of measuring variations in the physical properties of a drill hole not containing a column of conductive fluid, said method comprising conducting a volume of a conductive liquid into a drill hole, centering said volume of liquid in said drill hole in spaced relationship with the wall thereof, discharging at least a portion of said volume of liquid in at least one small-diameter jet stream directed substantially horizontally against the wall of said drill hole, conducting a current across the jet stream, and measuring the voltage required to conduct said current across said jet stream.

14. A method of measuring the resistivity of earth formations traversed by a drill hole not containing a column of conductive fluid, said method comprising conducting a volume of a high conductivity liquid into a drill hole, centering said volume of liquid in said drill hole in spaced relationship with the wall thereof, discharging at least a portion of said volume of liquid in at least one small-diameter jet stream directed substantially horizontally against the wall of said drill hole conducting a measured current across the jet stream, and measuring the voltage required to conduct said current across said jet stream as the jet stream impinges on formations of different resistivities.

15. A method of measuring variations in the diameter and cross-sectional area of a drill hole not containing a column of conductive fluid, said method comprising conducting a volume of a low conductivity liquid into a drill hole, centering said volume of liquid in said drill hole in spaced relationship with the wall thereof, discharging at least a portion of said volume of liquid in at least one small-diameter jet stream directed substantially horizontally against the wall of said drill hole, conducting a measured current across the jet stream, and measuring the voltage required to conduct said current across said jet stream as the length of the jet stream varies with changes in borehole diameter.

16. Electrical well logging apparatus for obtaining information regarding underground strata defining a dry bore hole in the earth comprising: an elongated hollow electrode having a compartment therein constituting a reservoir for electrically conductive liquid; means for moving said electrode longitudinally along said dry bore hole including an electrical conductor connected to said electrode and extending to the surface of the ground; and an electrically conductive liquid stream discharging opening within the confines of said electrode, said opening being in communication with said reservoir and being positioned to discharge a stream of conductive liquid received therefrom in a direction transverse to the long dimension of said electrode and into electrical contact with the adjacent wall of said borehole, the conductive liquid stream constituting the sole conductor of electricity between the electrode and the wall of said bore hole.

References Cited in the file of this patent

UNITED STATES PATENTS

| | | |
|---|---|---|
| 890,679 | Merriam | June 16, 1908 |
| 2,393,009 | Chun | Jan. 15, 1946 |
| 2,581,979 | Standing | Jan. 8, 1952 |
| 2,637,768 | Bragg | May 5, 1953 |
| 2,725,283 | Mounce | Nov. 29, 1955 |
| 2,825,872 | Stubbs | Mar. 4, 1958 |